United States Patent
Cipollone

(10) Patent No.: US 7,698,333 B2
(45) Date of Patent: Apr. 13, 2010

(54) INTELLIGENT QUERY SYSTEM AND METHOD USING PHRASE-CODE FREQUENCY-INVERSE PHRASE-CODE DOCUMENT FREQUENCY MODULE

(75) Inventor: Peter M. Cipollone, Princeton Junction, NJ (US)

(73) Assignee: Factiva, Inc., Monmouth Junction, NJ (US)

( * ) Notice: Subject to any disclaimer, the term of this patent is extended or adjusted under 35 U.S.C. 154(b) by 428 days.

(21) Appl. No.: 11/112,439

(22) Filed: Apr. 22, 2005

(65) Prior Publication Data

US 2006/0031218 A1 Feb. 9, 2006

Related U.S. Application Data

(60) Provisional application No. 60/590,247, filed on Jul. 22, 2004.

(51) Int. Cl.
G06F 7/00 (2006.01)
G06F 17/30 (2006.01)

(52) U.S. Cl. .................. 707/731; 707/730; 707/750

(58) Field of Classification Search ................ None
See application file for complete search history.

(56) References Cited

U.S. PATENT DOCUMENTS

| | | | |
|---|---|---|---|
| 5,542,090 A * | 7/1996 | Henderson et al. ............ 707/2 |
| 5,754,939 A | 5/1998 | Herz et al. |
| 5,924,090 A | 7/1999 | Krellenstein |
| 5,960,422 A * | 9/1999 | Prasad ............................ 707/2 |
| 6,038,561 A * | 3/2000 | Snyder et al. .................. 707/6 |
| 6,067,552 A * | 5/2000 | Yu ................................ 715/234 |
| 6,233,575 B1 | 5/2001 | Agrawal et al. |
| 6,260,041 B1 | 7/2001 | Gonzalez et al. |
| 6,292,830 B1 * | 9/2001 | Taylor et al. ................. 709/224 |
| 6,332,141 B2 | 12/2001 | Gonzalez et al. |
| 6,418,433 B1 | 7/2002 | Chakrabarti et al. |
| 6,711,585 B1 * | 3/2004 | Copperman et al. ....... 707/104.1 |
| 6,735,583 B1 | 5/2004 | Bjarnestam et al. |
| 6,868,525 B1 * | 3/2005 | Szabo ......................... 715/738 |
| 6,873,990 B2 * | 3/2005 | Oblinger ..................... 707/101 |
| 6,961,737 B2 | 11/2005 | Ritchie et al. |
| 7,035,864 B1 | 4/2006 | Ferrari et al. |
| 7,146,361 B2 | 12/2006 | Broder et al. |

(Continued)

OTHER PUBLICATIONS

"An Example-Based Mapping Method for Text Categorization and Retrieval", by Yiming Yang and Christopher G. Chute, *ACM Transactions on Information Systems*, vol. 12, Jul. 1994, No. 3, pp. 252-277.

(Continued)

*Primary Examiner*—Charles Rones
*Assistant Examiner*—Daniel Kuddus
(74) *Attorney, Agent, or Firm*—Dorsey & Whitney LLP

(57) ABSTRACT

An intelligent query system and method used in a search and retrieval system provides an end-user the most relevant, meaningful, up-to-date, and precise search results. The system and method allows an end-user to benefit from an experienced recommendation that is tailored to a specific industry. The system and method recognizes that the phrases "strike outs" and "home run" are much more strongly correlated with "BASE" as opposed to "EQUITIES." When a search is conducted or a lookup is done in a map, the system and method recommends the strongest correlation as "BASE."

2 Claims, 2 Drawing Sheets

U.S. PATENT DOCUMENTS

| | | |
|---|---|---|
| 7,266,548 B2 * | 9/2007 | Weare .................. 707/3 |
| 2001/0000356 A1 | 4/2001 | Woods |
| 2002/0087565 A1 * | 7/2002 | Hoekman et al. ........... 707/100 |
| 2003/0014405 A1 | 1/2003 | Shapiro et al. |
| 2003/0154196 A1 | 8/2003 | Goodwin et al. |
| 2003/0172059 A1 | 9/2003 | Andrei |
| 2003/0212666 A1 | 11/2003 | Basu et al. |
| 2003/0217052 A1 | 11/2003 | Rubenczyk et al. |
| 2004/0024790 A1 | 2/2004 | Everett |
| 2004/0060426 A1 * | 4/2004 | Weare et al. .......... 84/668 |
| 2004/0267718 A1 | 12/2004 | Milligan et al. |
| 2005/0060312 A1 | 3/2005 | Curtiss et al. |
| 2005/0097075 A1 * | 5/2005 | Hoekman et al. ........... 707/1 |
| 2005/0187923 A1 * | 8/2005 | Cipollone .............. 707/3 |

OTHER PUBLICATIONS

"Information Retrieval using a Singular Value Decomposition Model of Latent Semantic Structure", by George W. Furnas et al., Jun. 13, 1988, *Proceedings of the International Conference on Research and Development in Information Retrieval*, pp. 465-480.

* cited by examiner

INTELLIGENT QUERY SYSTEM AND METHOD USING PHRASE-CODE FREQUENCY-INVERSE PHRASE-CODE DOCUMENT FREQUENCY MODULE

CROSS-REFERENCE TO RELATED APPLICATION(S)

This application claims the benefit of U.S. Provisional Application No. 60/590,247, entitled "INTELLIGENT QUERY SYSTEM AND METHOD USING PHRASE-CODE FREQUENCY-INVERSE PHRASE-CODE DOCUMENT FREQUENCY MODULE", filed on Jul. 22, 2004, the subject matter of which is hereby incorporated by reference; and this application is also related to a co-pending patent application, U.S. Utility application Ser. No. 11/060,928, U.S. Publication No. 2005/0187923, filed on Feb. 18, 2005, the subject matter of which is hereby incorporated by reference.

FIELD OF THE INVENTION

The present invention relates generally to a search and retrieval system, and more particularly, to an intelligent query system and method used in a search and retrieval system.

BACKGROUND OF THE INVENTION

Existing search query systems have been designed to help provide comprehensive search and retrieval services. However, terms or phrases used by writers may extend to different meanings that belong to different categories. For example, many documents contain phrases "strike outs" or "home run." These terms are generally related to baseball. Occasionally, these terms are also used when evaluating the performance of financial equities analysts, such as "Those Internet picks were major strike outs", or "Choosing MSFT back in '86 was a real home run."

In the existing search and retrieval systems, the documents that contain "strike outs" or "home run" in the above example, whether they are baseball documents or financial documents, are searched and retrieved. Readers can be very frustrated by wasting a lot of time in reading the irrelevant documents.

Therefore, there is a need for an intelligent query system and method that is used in a search and retrieval system capable of providing an intelligent and efficient search and retrieval.

SUMMARY OF THE INVENTION

The present invention provides an intelligent query system and method used in a search and retrieval system with a document feed and a categorization engine.

In one embodiment of the present invention, documents about baseball are marked with a taxonomy element "BASE", and those about equities are marked with "EQUITIES". Accordingly, the intelligent query system of the present invention recognizes that the phrases "strike outs" and "home run" are much more strongly correlated with "BASE" as opposed to "EQUITIES." Therefore, when a search is conducted or a lookup is done in a map, the system recommends the strongest correlation as "BASE."

In one embodiment of the present invention, an intelligent query ("IQ") method comprises the steps of:
  providing a set or stream of documents (D) which contain text, pictures (with captions or other descriptive text), video/audio (with generated text transcript), and/or the other multimedia formats;
  categorizing each document into a taxonomy (C) with corresponding taxonomy elements wherein the taxonomy can be pre-defined or ad hoc;
  filtering terms within the text to generate terms (Tt) and stop terms (Ts), wherein terms (Tt) are single words which express semantic value to the document to a certain meaningful degree, and stop terms (Ts) are single words which has little or no semantic value (i.e. "the", "an", and "a");
  discarding the stop terms (Ts) and defining the remaining terms (Tt) as T;
  transforming the terms (T) to eliminate multi-collinearity and correlating each transformed term t to each taxonomy element c on a containing document, wherein t is an element of T, and c is an element of C;
  storing t and c in a database;
  counting documents that contain c;
  increasing a correlation value between term t and taxonomy element c
  each time when the term t appears in the document; and
  continuing the above steps for all remaining documents.

With the data collected from the above process, an IQ map can be generated by the following steps:
  scoring t-c pairs according to a PCF-IPCDF scoring system or model;
  loading the pairs with the highest scores into a map structure for facilitating lookup of the taxonomy element c from the term element t; and
  deducing the taxonomy element c from term t.

One exemplary PCF-IPCDF scoring system or model is described in the patent application, U.S. Utility application Ser. No. 11/060,928, U.S. Publication No. 2005/0187923, filed on Feb. 18, 2005, the subject matter of which is hereby incorporated by reference.

The map structure can be loaded into applications which benefit from being able to deduce relevant taxonomy elements from terms. Such applications include, but not limited to, search engines and tracking engines.

Some exemplary uses of the map (or IQ map) include guiding a user toward relevant search topics, presenting a user with a list of related taxonomy terms, and/or transparently focusing a search for a user.

Therefore, in the above baseball example, the intelligent query system of the present invention recognizes that the phrases "strike outs" and "home run" are much more strongly correlated with "BASE" as opposed to "EQUITIES." Therefore, when a lookup is done in the map, the system recommends the strongest correlation as "BASE."

These and other features and advantages of the present invention will become apparent to those skilled in the art from the attached detailed descriptions, wherein it is shown, and described illustrative embodiments of the present invention, including best modes contemplated for carrying out the invention. As it will be realized, the invention is capable of modifications in various obvious aspects, all without departing from the spirit and scope of the present invention. Accordingly, the descriptions are to be regarded as illustrative in nature and not restrictive.

DETAILED DESCRIPTIONS OF THE PREFERRED EMBODIMENT

The present invention provides an intelligent query system and method used in a search and retrieval system with a document feed and a categorization engine.

Figure 1:
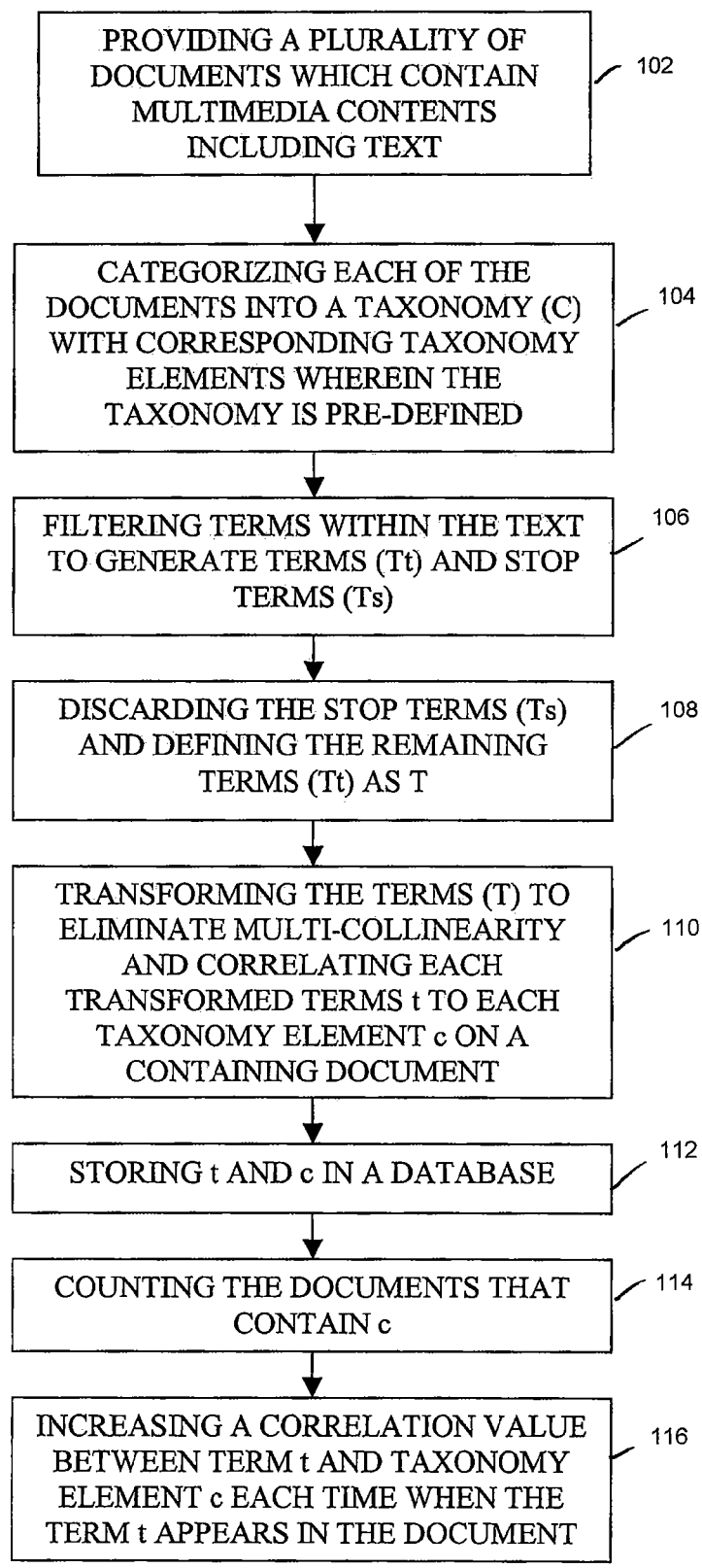
FIG. 1 illustrates a flow chart of one exemplary intelligent query process in accordance with the principles of the present invention.

FIG. 1 shows an exemplary intelligent query process 100 in accordance with the principles of the present invention. The process 100 starts with a step 102 of providing a set or stream of documents (D) which contain text, pictures (with captions or other descriptive text), video/audio (with generated text transcript), and/or the other multimedia formats. Then, each document is categorized into a taxonomy (C) with corresponding taxonomy elements wherein the taxonomy can be pre-defined or ad hoc in a step 104. In the next step 106, terms within the text are filtered to generate terms (Tt) and stop terms (Ts), wherein terms (Tt) are single words which express semantic value to the document to a certain meaningful degree, and stop terms (Ts) are single words which has little or no semantic value (i.e. "the", "an", and "a"). Then, the stop terms (Ts) are discarded, and the remaining terms (Tt) are defined as T in a step 108. Next, the terms (T) are transformed to eliminate multi-collinearity and correlate each transformed term t to each taxonomy element c on a containing document, wherein t is an element of T, and c is an element of C, in a step 110. t and c are then stored in a database in a step 112. Then, documents that contain c are counted in a step 114. In a next step 116, a correlation value between term t and taxonomy element c is increased each time when the term t appears in the document. The above steps are repeated for all remaining documents.

Figure 2:
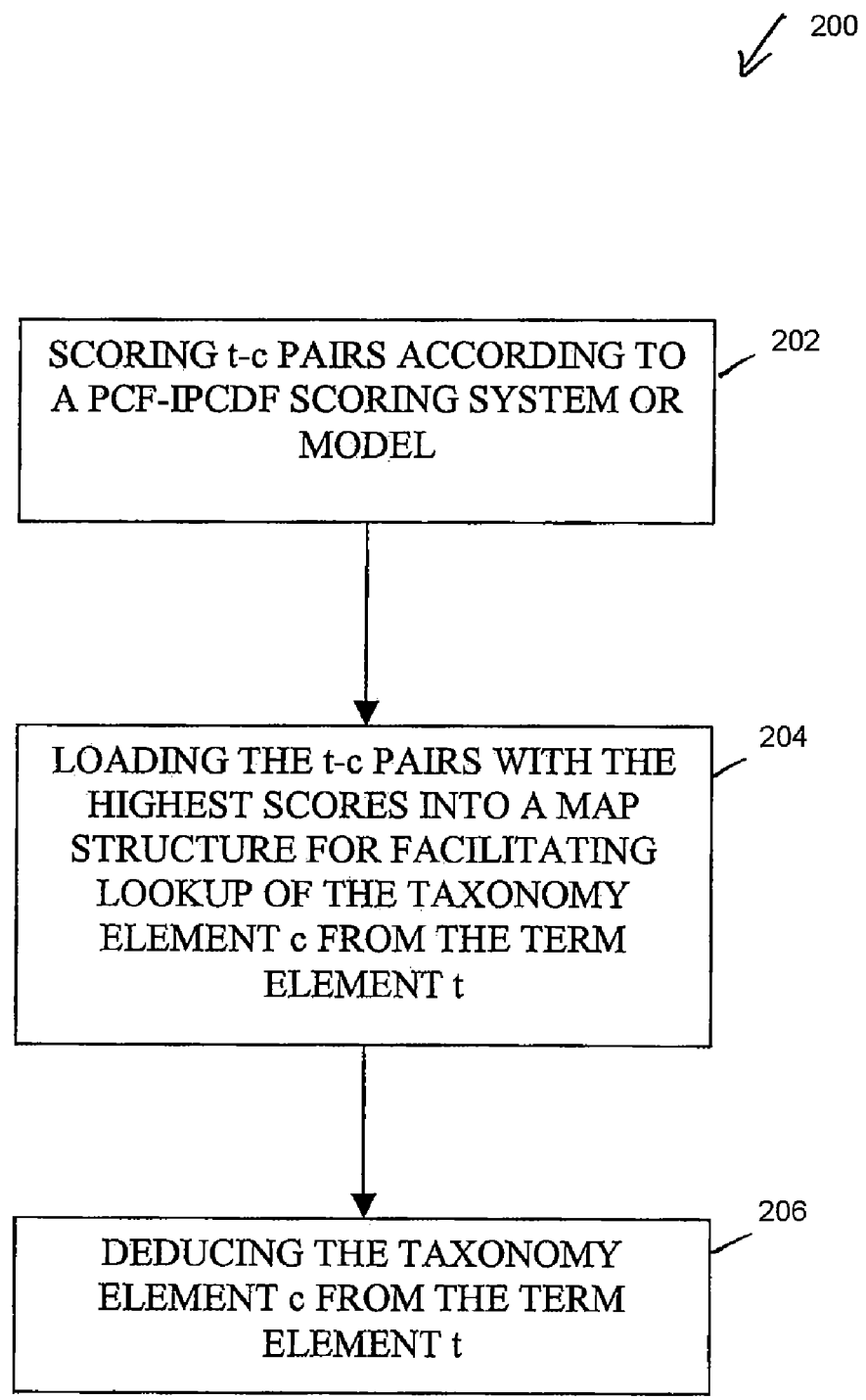
FIG. 2 illustrates a flow chart of one exemplary process of generating an IQ map in the intelligent query process in accordance with the principles of the present invention.

FIG. 2 shows one exemplary process 200 of generating an IQ map in the intelligent query process in accordance with the principles of the present invention. The process 200 starts with a step 202 of scoring t-c pairs according to a PCF-IPCDF scoring system or model. Then, in a step 204, the t-c pairs are loaded with the highest scores into a map structure for facilitating lookup of the taxonomy element c from the term element t. Next, the taxonomy element c is deduced from the term element t in a step 206.

It is noted that an exemplary PCF-IPCDF scoring system or model has been described in the co-pending patent application, U.S. Utility application Ser. No. 11/060,928, U.S. Publication No. 2005/0187923, filed on Feb. 18, 2005, the subject matter of which is hereby incorporated by reference.

In particular, a Phrase-Code Frequency-Inverse Phrase-Code Document Frequency (PCF-IPCDF) module in accordance with the present invention selects the codes for improving user searches. The system outputs the codes or restricts sources of the query and thereby improve very simply specified searches.

Definitions of certain terms are as follows:

| | |
|---|---|
| Phrase-code frequency (pcf) | $pcf(p,c)$ is the number of times phrase p appears in documents containing code c. |
| Inverse Phrase-Code Document Frequency (ipcdf) | $ipcdf = \log \frac{D(c)}{df(p, c)}$ where $D(c)$ is the number of documents coded with c and $df(p,c)$ is the number of documents for which the phrase p and code c appear together. |
| Phrase | A word or grammatical combination of words, such as a person's name or geographic location, as identified by a linguistic phrase extraction preprocessor. |
| Score | $s(p,c) = pcf(p,c) \cdot ipcdf(p,c)$ |

The map structure can be loaded into applications which benefit from being able to deduce relevant taxonomy elements from terms. Such applications include, but not limited to, search engines and tracking engines.

As a result, documents about baseball are marked with a taxonomy element "BASE", and those about equities are marked with "EQUITIES". The intelligent query system of the present invention recognizes that the phrases "strike outs" and "home run" are much more strongly correlated with "BASE" as opposed to "EQUITIES." Therefore, when a search is conducted or a lookup is done in a map, the system recommends the strongest correlation as "BASE."

One of the advantages of the present invention is that it provides end-users the most relevant, meaningful, up-to-date, and precise search results.

Another advantage of the present invention is that an end-user is able to benefit from an experienced recommendation that is tailored to a specific industry.

These and other features and advantages of the present invention will become apparent to those skilled in the art from the attached detailed descriptions, wherein it is shown, and described illustrative embodiments of the present invention, including best modes contemplated for carrying out the invention. As it will be realized, the invention is capable of modifications in various obvious aspects, all without departing from the spirit and scope of the present invention. Accordingly, the above detailed descriptions are to be regarded as illustrative in nature and not restrictive.

What is claimed is:

1. An intelligent query method, comprising the steps of:
providing a plurality of multimedia documents each containing a plurality of content items using an electronic document feed;
categorizing each of the documents into at least one of a plurality of pre-defined content based taxonomies, each taxonomy having an associated substantive content and corresponding taxonomy elements; and
using a computer-implemented categorization engine:
filtering the plurality of content items in each document into at least two groups;
discarding at least one of the groups of content items for each document;
for each document, correlating each of the non-discarded content items in the document with the taxonomy elements corresponding to the at least one taxonomy in which the document is categorized;
storing the correlated taxonomy elements and non-discarded content items for each document in an electronic database; and
calculating a correlation value between the non-discarded content items for each document and the correlated taxonomy elements;
wherein calculating the correlation value comprises applying a phrase code frequency inverse phrase code document frequency (PCF-IPCDF) scoring model to the correlated taxonomy elements; and
wherein the PCF-IPCDF scoring model comprises a phrase-code frequency (PCF), the PCF being the number of times a phrase p appears in multimedia documents containing a code c, multiplied by an inverse phrase code document frequency (IPCDF), the IPCDF being a logarithm of: the number of documents coded with c divided by the number of documents for which the phrase p and code c appear together.

2. The method of claim 1 further comprising loading the non-discarded content items for each document and the correlated taxonomy elements with the highest correlation values into a map structure for facilitating deduction of a taxonomy element based on its associated substantive content.

* * * * *